Jan. 20, 1948. W. R. MATHIS 2,434,708
MOLDING APPARATUS FOR FORMING BUILDINGS
Filed Dec. 5, 1942 8 Sheets-Sheet 1
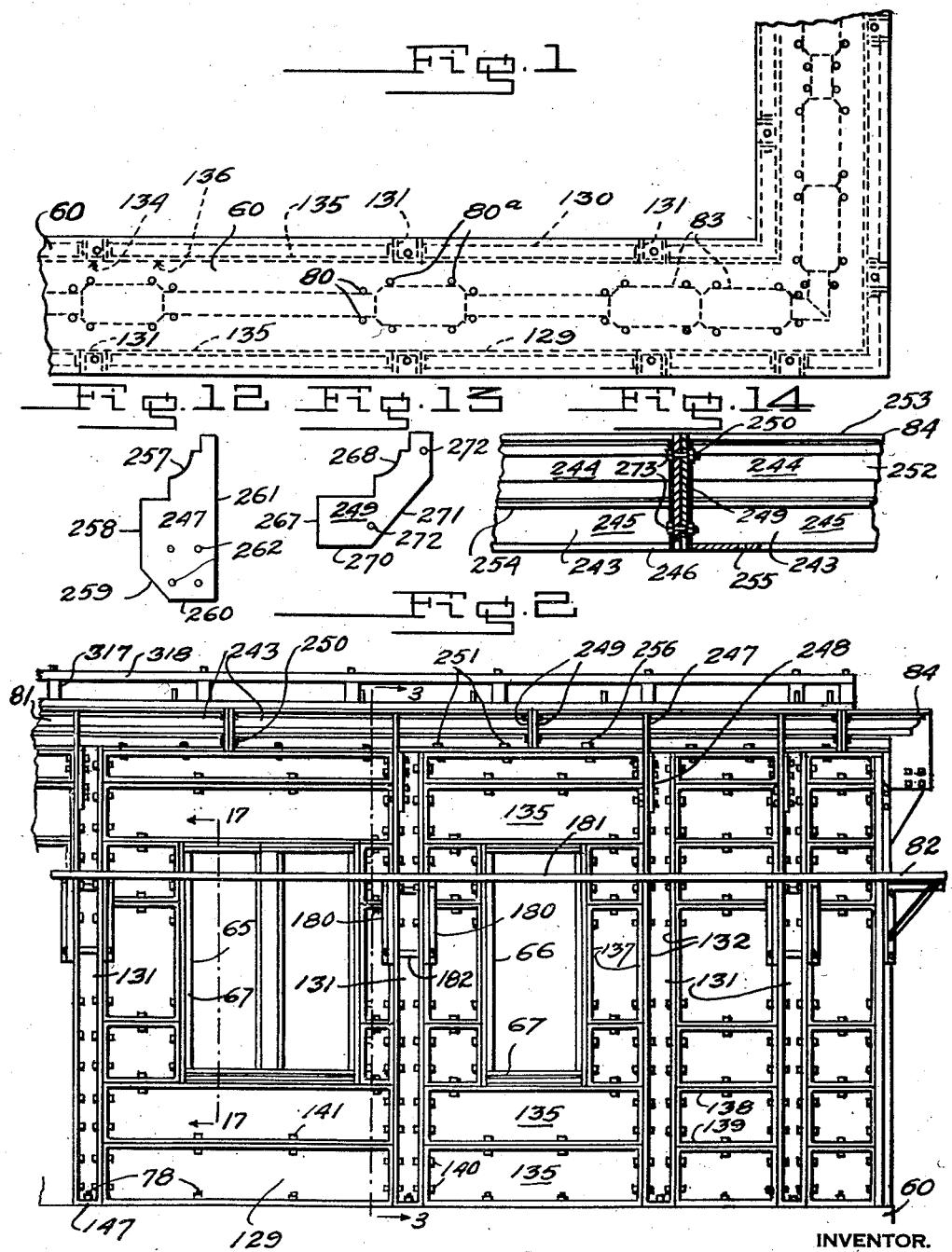
INVENTOR.
William R. Mathis
BY
ATTORNEYS.

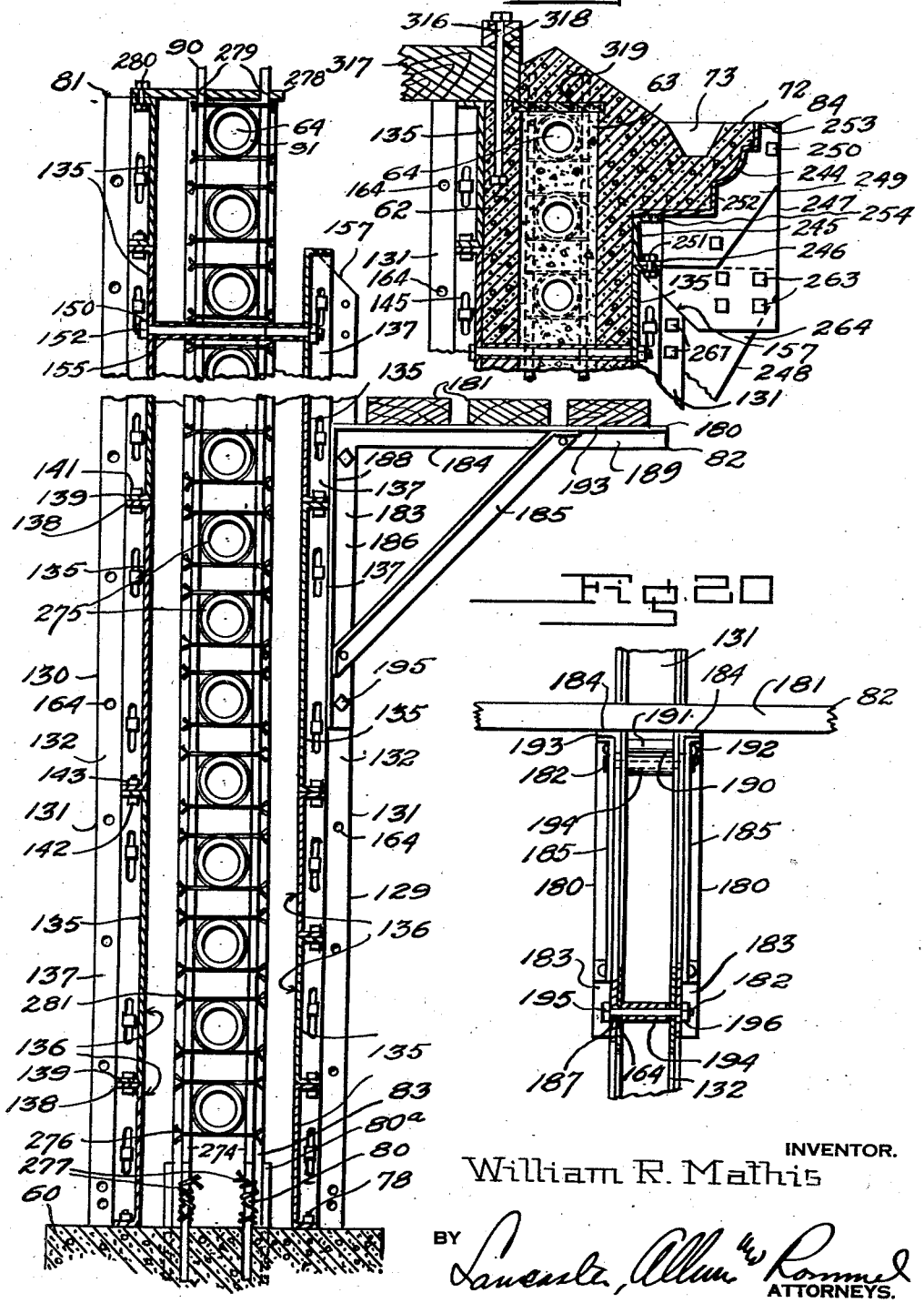

Jan. 20, 1948.  W. R. MATHIS  2,434,708
MOLDING APPARATUS FOR FORMING BUILDINGS
Filed Dec. 5, 1942  8 Sheets-Sheet 3
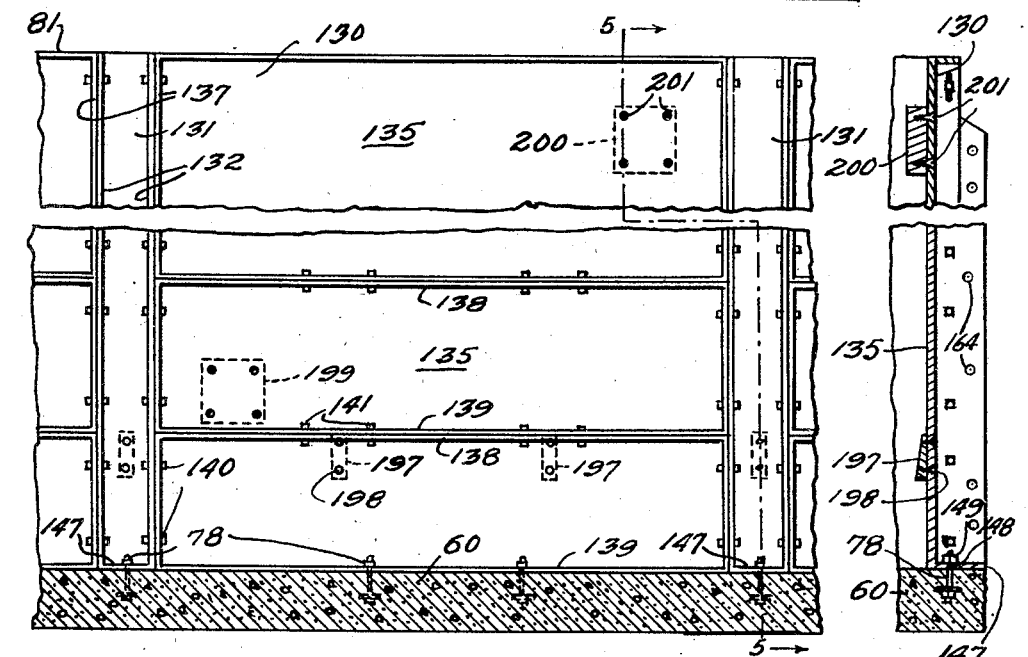
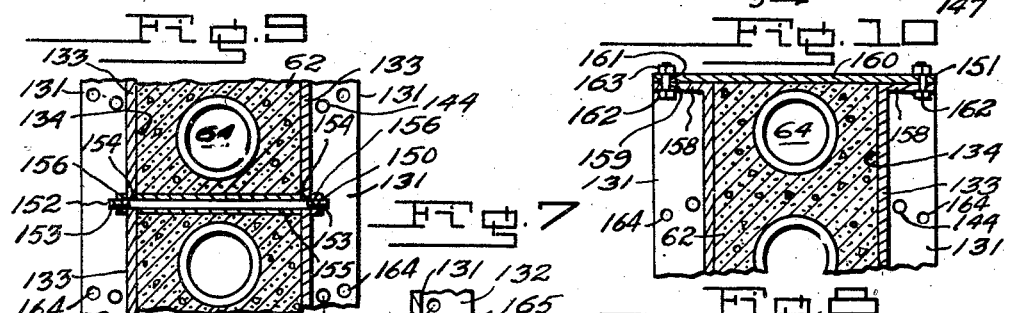
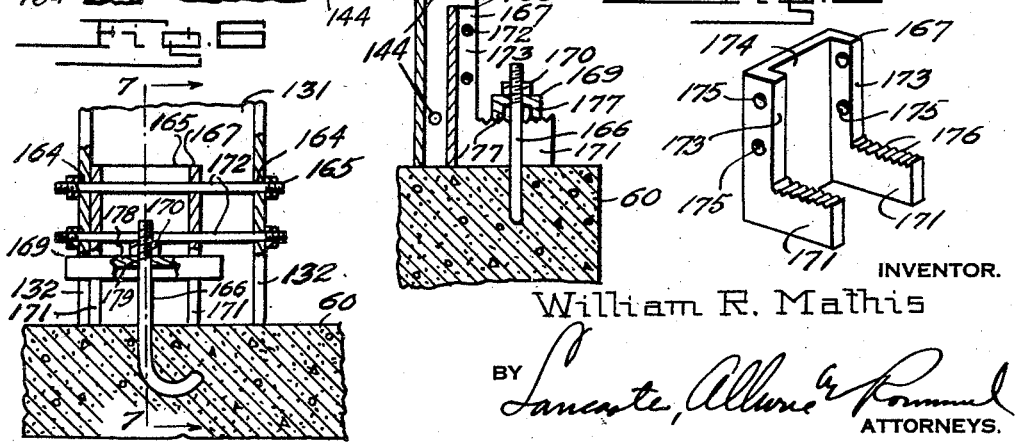
INVENTOR.
William R. Mathis
BY
ATTORNEYS.

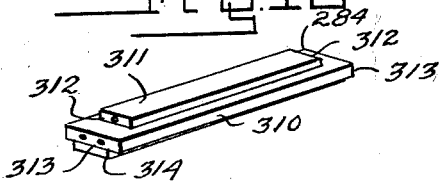
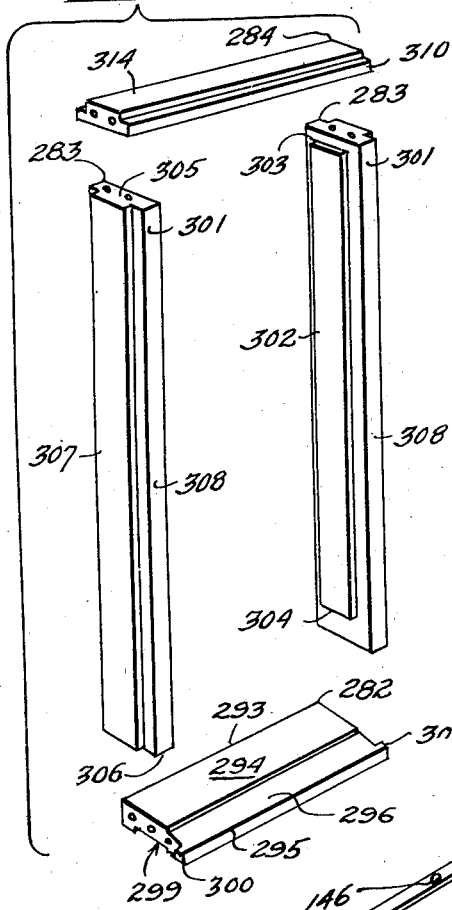
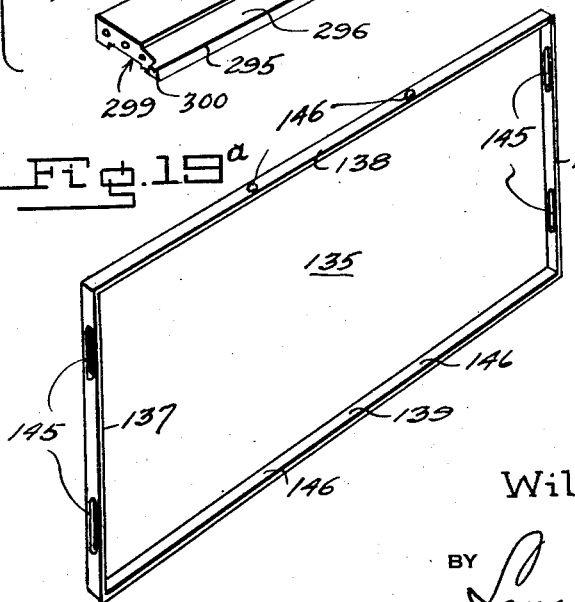

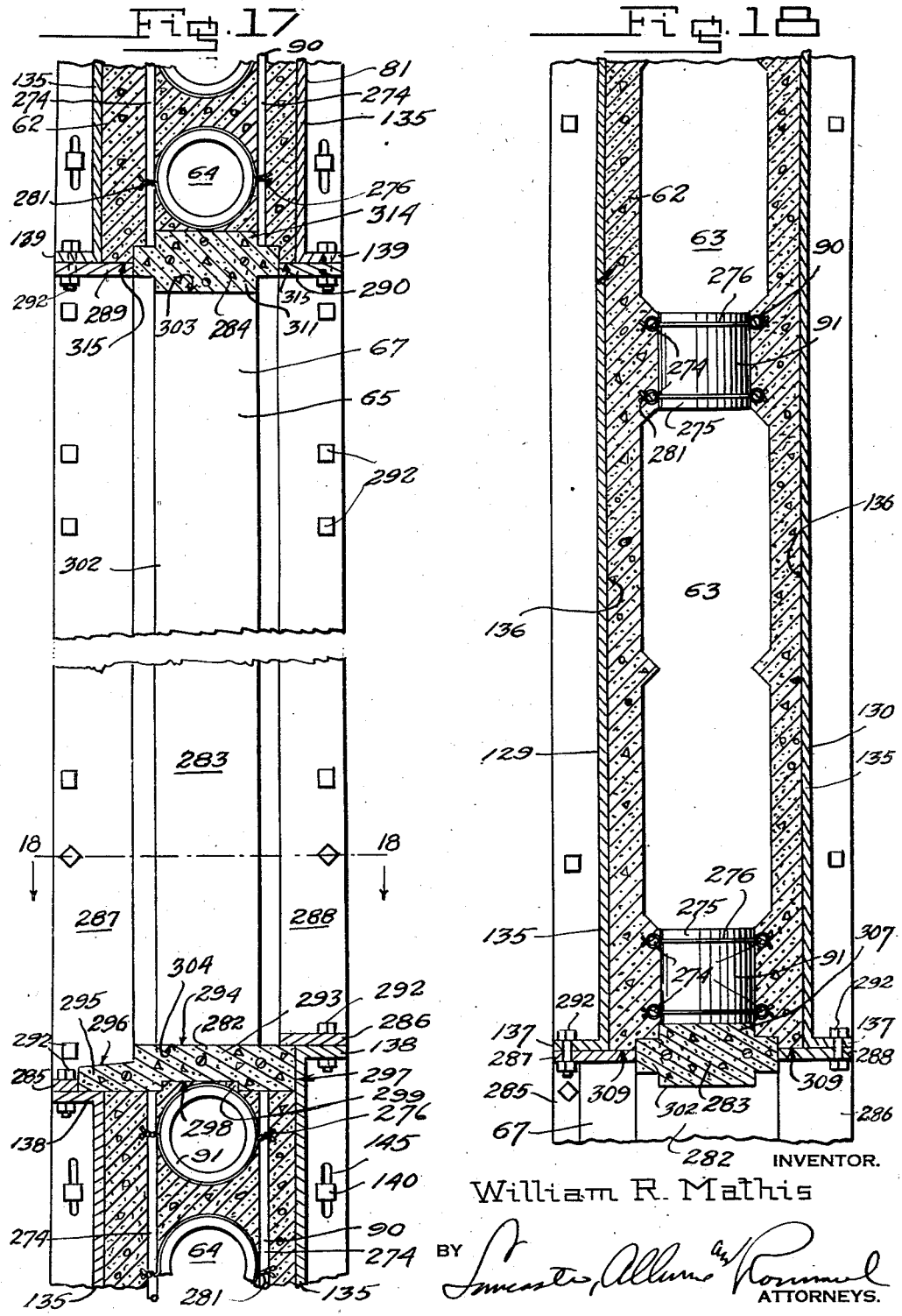

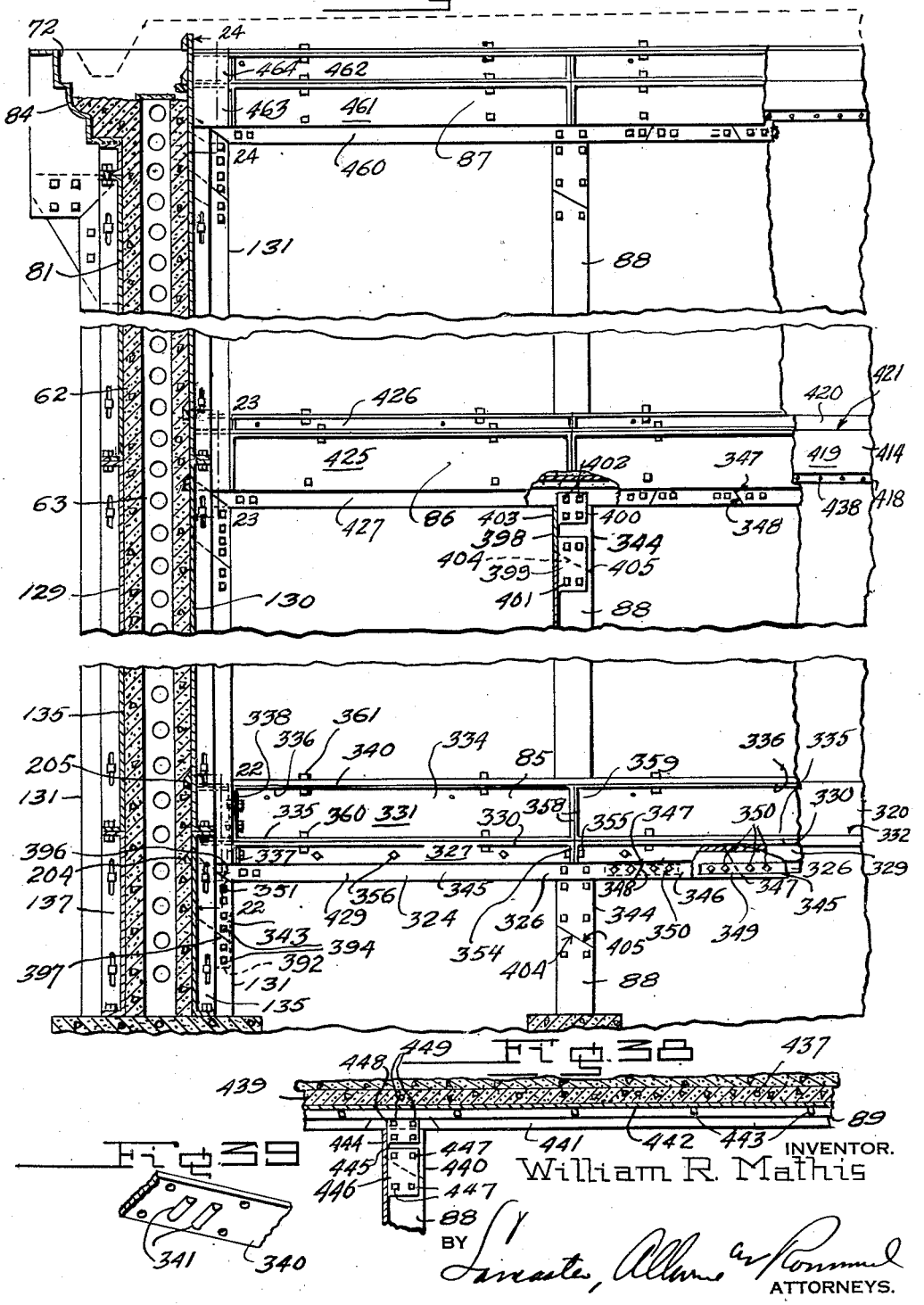

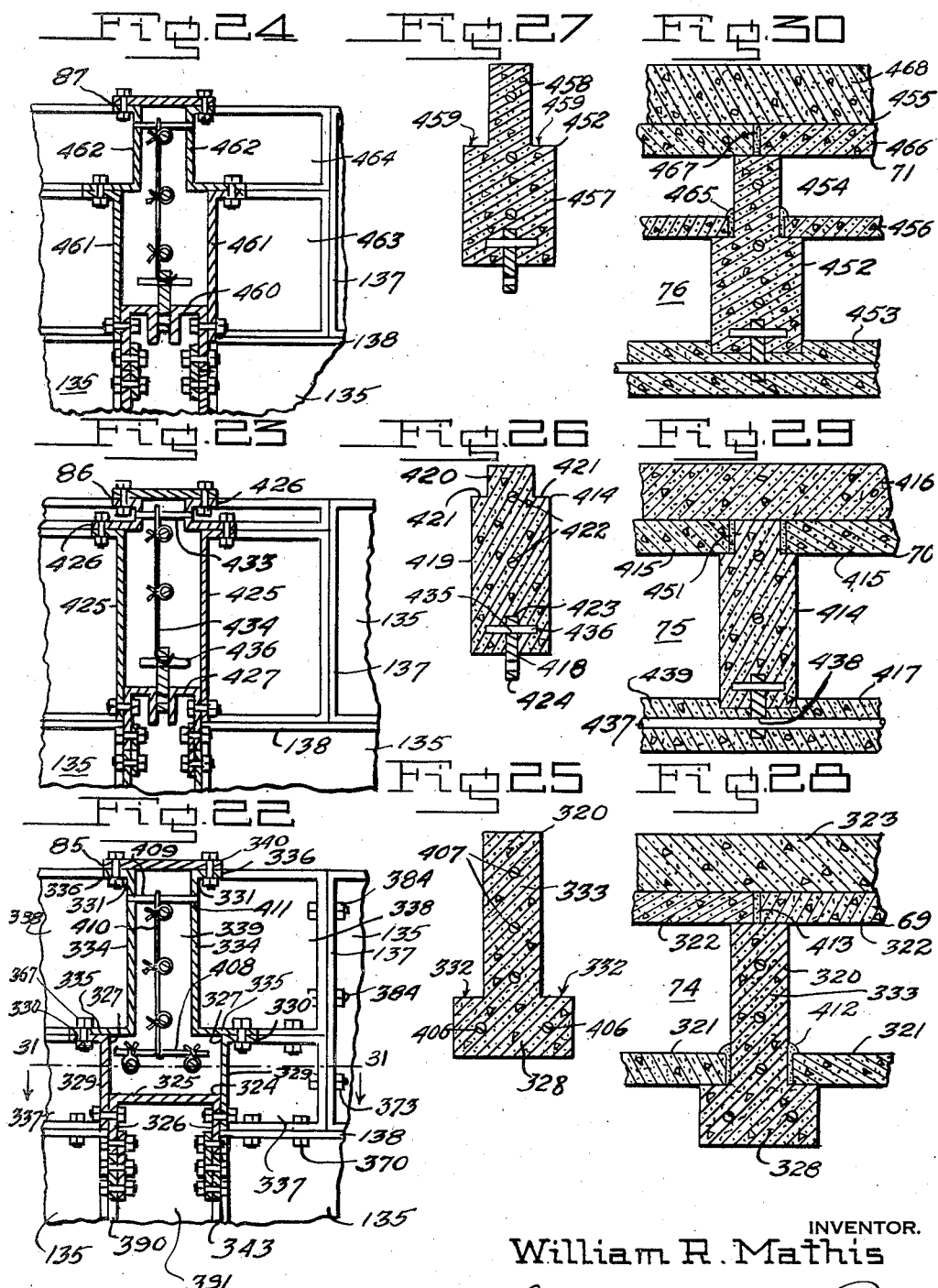

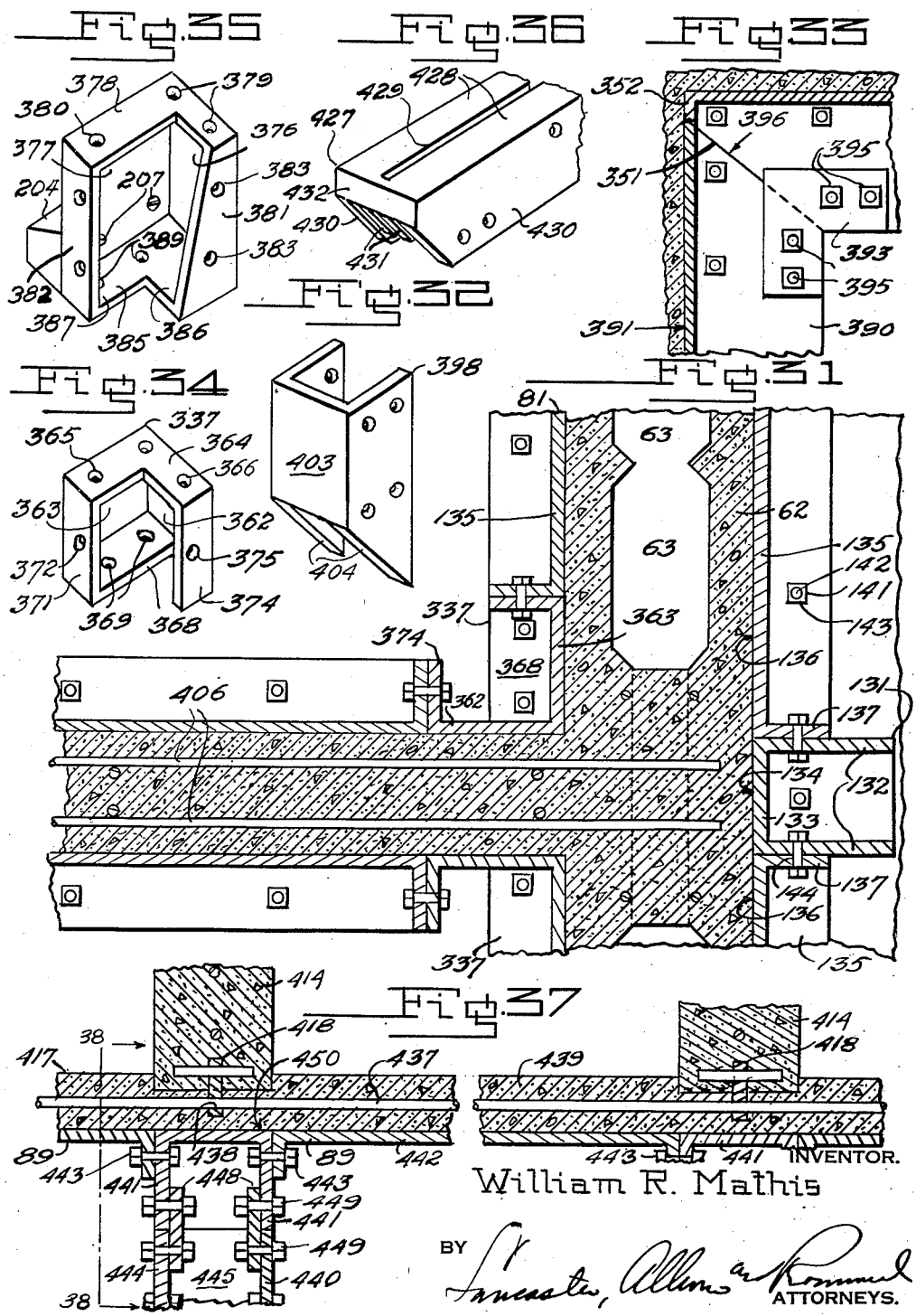

Patented Jan. 20, 1948

2,434,708

UNITED STATES PATENT OFFICE 2,434,708

MOLDING APPARATUS FOR FORMING BUILDINGS

William R. Mathis, Tampa, Fla.

Application December 5, 1942, Serial No. 467,971

5 Claims. (Cl. 25—131)

The present invention relates to building construction and more particularly to apparatus for forming buildings made mainly of concrete and cementitious material, with suitable reinforcement.

The principal object of the invention is to provide apparatus for building construction which may be economically manufactured, preferably from sheet metal, and a selection made of available apparatus units, according to the design of the building, to assemble the form for the pouring of concrete without the delay and expense of cutting and fitting many special form pieces. The invention contemplates reuse of the apparatus units for the erection of the walls and other portions of many buildings of the same or different design, the units being practically indestructible and requiring little, if any, cutting or boring to meet the requirements of floor, ceiling and roof construction, either of wood, or of fireproof material.

Another object is to provide wall forms, and cornice forms and scaffolding for cooperation with the wall forms, which cornice forms and scaffolding may be quickly placed and removed, and the scaffolding moved to a different position on the wall forms as erection of the wall forms, opening frames and cornice forms are progressively placed.

Another object is to provide wall forms comprising relatively long, narrow main sustaining upright members which may each be of story height or more, and initially secured to a footing or foundation in spaced relation; and, panels and opening frames which may be secured to the main upright members, either progressively as the concrete is poured, or completely secured to the main upright members before any pouring step.

Another object of the invention is to provide forms for the formation of girders of substantially inverted T-shape cross section, suitable for receiving floor and/or ceiling slabs, which forms may be made of cast or rolled metal units of angular cross-section, such as channel and angle members, and of metal plates and strips which may be readily assembled and dismembered.

Another object of the invention is to provide forms for forming such girders of substantially inverted T-shape, cross section, integral with walls, the girder form units cooperating with the wall forms also made of metal units such as channel members and metal wall panels, in such manner that the concrete or cementitious material may be poured into the wall and girder forms in a manner to form the girders integral with the walls, and to permit removal of the various form units when the wall and girder materials are set, for reuse of the forms at other portions of the building construction, or at other projects.

A further object of the invention is to provide apparatus for forming girders of buildings including upright supports for the forms, which may be removed with ease and safety after the concrete or cementitious material in the forms has set.

Other objects and advantages of the invention will appear in the following detailed description, taken in connection with the accompanying drawings, forming a part of this specification, and in which drawings:

Fig. 1 is a fragmentary plan view of a footing with bolts and reinforcing stubs extending from the upper surface thereof and showing by dotted lines the positions wall forms will take upon the footing.

Figure 2 is a fragmentary view in elevation of the wall and cornice forms of a one story building mounted on the footing with suitable opening frames and scaffolding in place.

Figure 3 is an enlarged fragmentary vertical sectional view on substantially the line 3—3 of Fig. 2.

Figure 4 is a fragmentary view in elevation looking toward the interior of the assembled wall form.

Figure 5 is a fragmentary vertical sectional view on the line 5—5 of Figure 4.

Figure 6 is a detail view partly in elevation and partly in vertical section of a modified manner in which the wall forms may be temporarily secured to the footing.

Figure 7 is a sectional view on the line 7—7 of Figure 6.

Figure 8 is a perspective view of one of the securing elements shown in Figures 6 and 7.

Figures 9 and 10 are detail views in vertical section of means for holding vertical forms in proper spaced relation and against lateral displacement.

Figure 11 is a detail view in vertical section of the manner in which a cornice, guttering etc. may be formed at the top of a wall, integral with the wall.

Figures 12 and 13 are detail views in side elevation of parts of a suitable cornice form.

Figure 14 is a fragmentary view in elevation of assembled parts of the cornice form.

Figure 15 is a view in perspective of dismembered parts of a suitable opening frame.

Figure 16 is a perspective view of one of the elements of the frame in inverted position.

Figure 17 is a detailed vertical sectional view on the line 17—17 of Fig. 2.

Figure 18 is a horizontal sectional view on the line 18—18 of Fig. 17.

Figs. 19a and 19b are perspective views of a flat wall form member, and a corner wall form member, respectively.

Fig. 20 is a fragmentary detail view in elevation of suitable scaffolding which may be attached to and supported by wall form members as shown in Fig. 2.

Fig. 21 is a fragmentary view partly in vertical section and partly in elevation showing wall and girder forms suitable for a construction of a multi-floor building.

Figs. 22, 23 and 24 are fragmentary detail views in elevation and vertical section on the lines 22—22, 23—23 and 24—24, respectively of Fig. 21 showing forms for producing girders.

Figs. 25, 26 and 27 are vertical sectional views of girders, showing the products resulting from use of the forms shown in Figs. 22, 23 and 24, respectively.

Fig. 28 is a vertical sectional view showing ceiling and floor slabs and a floor finish associated with the girder illustrated in Fig. 25.

Fig. 29 is a vertical sectional view showing floor slabs, floor finish and ceiling associated with the girder shown in Fig. 26.

Fig. 30 is a vertical sectional view showing roof slabs, finished roof, dead air space slabs, spaced below the roof slabs and ceiling, associated with the girder shown in Fig. 27.

Fig. 31 is a horizontal sectional view on substantially the line 31—31 of Fig. 22.

Figs. 32 to 36 inclusive are perspective views of units used in forming girders.

Figure 37 is a detailed vertical sectional view thru the lower portion of concrete girders and ceiling formation with forms in place for supporting the ceiling material until it has set.

Figure 38 is a reduced vertical sectional view on the line 38—38 of Fig. 37.

Figure 39 is a perspective view of the end portion of a plate used on certain girder forms to prevent unset concrete from being forced from the form and to produce air ways transversely of the girder adjacent the wall.

Generally speaking, the present invention is intended to meet the demands for low cost buildings such as dwellings, garages, etc., which may be made habitable in a short space of time, and which will provide dry walls, preferably insulating the interior from the exterior. They include suitable footings 60 for sustaining the superimposed dead and live loads, and extending into the earth 61 below the frost line where freezing temperatures are likely to exist, and to firm ground; hollow concrete exterior wall portions 62 preferably provided with vertical air spaces or voids 63 and communicating horizontal air spaces or voids 64, and openings, such as window openings 65 and 66 suitably defined by frames 67.

In the construction of small buildings, or where fireproof construction is not required thruout, any suitable floor, partition and roof constructions may form a part of the building. However, the invention also contemplates providing fireproof construction thruout by girder, floor and ceiling construction 69 shown in Figs. 21, 25, 28 and 31 suitable for main floor where exposed portions of girders at the under side are not objectionable; girder, floor and ceiling construction 70 shown in Figs. 21, 26, 29, 37 and 38, where it is desired to conceal the girders; and girder, roof and ceiling construction 71, shown in Figs. 21, 27, 30, 37 and 38.

Certain wall form members are also suitable for use in supporting cornice forms for producing a suitable cornice 72, integral with the walls, which may have a gutter 73 for conducting and draining off water from the roof, since ordinary wood and metal guttering is a source of much trouble.

The invention also contemplates using the vertical and horizontal air spaces 63 and 64 in walls and partitions, and horizontal air spaces 74, 75 and 76, in constructions 69, 70 and 71, shown in Figs. 28, 29 and 30 respectively, for conducting and circulating hot, cold and conditioned air for promoting comfort and good health.

Suitable apparatus is provided to facilitate building construction and to reduce the cost of such, by the use of braces, guides, mold forms, cores, scaffolding, etc., made mostly or all of metal, or other suitable material, which are subjected to practically no wear, and may be reused almost indefinitely for different building operations. The apparatus is particularly well adapted for use with the concrete footings 60 which may be provided with suitable anchor members 78 embedded in and extending from the upper surface thereof, and reinforcement stubs 80 and 80ᵃ. The apparatus preferably comprises wall mold apparatus 81; scaffolding 82; cores 83 for producing the vertical air spaces or voids 63, which may be of any suitable character such as the core in U. S. Patent to McCahon 814,154, March 6, 1906; cornice mold 84; girder molds 85, 86 and 87 for producing the girders of constructions 69, 70 and 71, respectively, supported by upright members 88; and, mold means 89 for molding ceiling.

The horizontal air spaces or voids 64 are preferably formed by apparatus 90 which, in the main, remain in the wall and serve to reinforce the wall, altho these spaces or voids may be made, in small buildings, by simply progressively positioning tubes 91 on beds of concrete when it is sufficiently firm, but not set, or upon one another, and then filling in the spaces laterally of the tubes.

Referring now to the wall mold apparatus 81 for making monolithic exterior walls, and suitable also for making partitions, it mainly comprises opposite spaced cementitious wall material confining runs 129 and 130 of form units detachably connected together. Each run mainly comprises a plurality of spaced upright metallic channel members 131, each preferably having relatively deep flanges 132 for strength and for support of scaffolding, etc., and a web 133, the outer face 134 of which forms a part of the wall material engaging surface; a plurality of metallic flanged mold panels 135, also of metal, fitting between the channel members 131, each panel having a face 136 flush with the face 134 to also form a part of the wall material engaging surface, and each panel provided with relatively shallow lateral flanges 137 and relatively shallow top and bottom flanges 138 and 139, respectively; means 140 for detachably securing the panels to the channel members; and means 141 for detachably securing each panel to the superjacent panel. The means 140 and 141 may be any suitable clamping devices, such as bolts 142 provided with nuts 143, shown particularly in Fig. 31, and to facilitate their use each flange of each channel member 131 is provided with a series of vertically spaced transverse holes 144 adjacent the web 133, each lateral flange 137 of each panel 135 is provided with one or more transverse holes 145, preferably slots, to align with selected holes of the series in the adjacent flange of the channel members, and each top and bottom flange of each panel is provided with aligning transverse holes 146 to permit securing the panels together one upon another.

The runs 129 and 130 of form units are preferably held in proper spaced relation at their bottoms by the footings 60 and anchor members 78. The preferred manner of detachably connecting the channel members 131 to the footings is by the provision of a foot flange 147 having an opening 148 for the shank of the anchor member 78, and a nut 149 screwed onto the screw threaded portion 120 of the bolt, as shown in Fig. 5. This is a very suitable arrangement where the anchor bolts are accurately placed in the footing.

Any suitable means may be provided to hold the runs 129 and 130 of form units in proper spaced relation intermediate their tops and bottoms and in one story constructions it may suffice to provide such means only adjacent or at the tops of the channel members 131. As an example, either means 150 such as is shown in Fig. 9 for temporarily holding the upper end portions of opposite channel members in proper spaced relation by engaging the members below their upper ends, or means 151 such as is shown in Fig. 10 for likewise temporarily holding the tops of the opposite channel members in proper spaced relation, or both means 150 and 151 may be used. The means 150 as shown in Figs. 3 and 9 comprises a rod 152 having its ends screw threaded as at 153, traversing the hollow of the mold and extending thru openings 154 in the webs 133 of the channel members; a spacing sleeve 155 surrounding the traversing portion of the rod; and nuts 156 on the screw threaded end portions of the rod. This means 150 is suitable for use where the upper end of the channel member has the upper ends of its flanges beveled as at 157 in Figs. 3 and 11 to facilitate dismembering of the mold. In Fig. 10 is shown the means 151. There the channel members 131 each have a head flange 158 provided with a transverse opening 159. A bar 160 having transverse openings 161 adjacent its ends align with openings 159, receiving bolts 162 provided with nuts 163.

I prefer to provide each flange 132 of each channel member 131 with a second series of vertically spaced transverse holes 164 adjacent the free edge of the flange for supporting the scaffolding 82 and for other purposes hereinafter set forth. In Figs. 6, 7 and 8 I show a modified means 165 for detachably securing the channel members 131 to the footing and which does not require the use of foot flanges 147 on the channel members, but permits the use of some of these holes 164 for this purpose. This means 165 is particularly useful, altho not necessarily restricted to use in erecting small buildings, where the anchor members are only approximately placed in the footings for temporarily securing the channel members to the footings. The means 165, for each channel member, comprises, in addition to the anchor bolts 166, a channel-like L-shaped bracket 167 narrower in width than the space between the flanges 132 of the channel member, a clamp bar 169, and a nut 170 for cooperation with the anchor bolt and legs 171 of the bracket, and bolts 172 cooperating with the flanges 132 and legs 173 of the bracket. The legs of the bracket are held in spaced apart relation by a web 174, the upright legs 173 have transverse holes 175 for the bolts and the upper parts of the horizontal legs 171 are preferably provided with spaced teeth 176. The bar 169 is preferably channel-shaped with its downwardly extending flanges 177 ribbed to fit between selected teeth on the legs and the web 178 of the bar is provided with a centrally located transverse hole 179 for receiving the anchor bolt 166.

Thus the anchor bolts 166 may be approximately placed in position for detachably securing the channel members on the footing, but the channel members may each be accurately placed and secured to the footing inasmuch as the bracket 167 may be shifted to various positions between the flanges of the channel members, along the bolts 172, and the bar 169 may take various positions toward or remote from the channel member 131 and transversely of the tops of the horizontal legs 174 of the bracket, as is obvious from an inspection of Figs. 6 and 7.

The second series of holes 164 in the flanges of the channel members may also be used to support scaffolding, as shown in Figs. 2 and 3, a portion of the scaffolding being detailed in Fig. 20. It comprises deck brackets 180, decking 181 and means 182 for detachably securing the brackets in various adjusted positions along the channel members.

Each bracket 180 preferably comprises a vertical leg 183, a horizontal upper leg 184 and a diagonal brace 185, all preferably made of metal angle sections. The vertical leg has a flange 186 to abut against the side of the flange 132 of the channel member 131 and is provided with transverse holes 187 spaced to align with selected holes 164 of the second series of holes in the channel member, and a flange 188 to abut against the lateral flanges 137 of the adjacent panels 135, as shown in Figs. 2 and 3. The horizontal leg 184 has a vertical flange 189 preferably connected to the like flange of a companion bracket by a stiffener 190 comprising a spacing sleeve 191 and a bolt 192. The horizontal leg 184 also has a horizontal flange 193 upon which the decking 181 rests. The braces 185 may be riveted, welded or otherwise secured to the flanges 186 and 189.

The means 182 may comprise a spacing sleeve 194 and a bolt 195 with nut 196, the shank of the bolt extending thru aligned holes 164 and 187 and thru the sleeve 194, as shown in Fig. 20. This arrangement, shown by way of example, makes a very sturdy scaffolding arrangement, using the form as a support and enables the scaffolding to be adjusted upwardly to various positions as work in assembling the forms and cores progresses, and to arrange the corner forms and facilitate pouring of the cementitious wall material, either progressively as the forms and cores are placed, or after the wall and cornice mold has been completed.

In the construction of buildings where wood joists are to be placed, the channel members 131 and panels 135 may carry suitably shaped blocks 197, shown in Figs. 4 and 5, secured in place by screws 198 to form depressions, (not shown in the drawings) in the wall portions 62. In a like manner, larger rectangular blocks 199 and 200, of wood or other suitable material, may be secured as by screws 201 to the inner faces of the panels 135, as shown in Figures 4 and 5 to form openings in the walls for the registers, not shown in the drawing.

The cornice mold 84 is used when it is desired to provide a cornice integral with the wall, and in Figs. 2, 11, 12–14 and 21, its use and preferred characteristics are shown. The finish to be given to the wall inwardly of the cornice depends on the type of roof construction that will be used to complete the building. In Fig. 11 there is shown a finish suitable for a gable roof and in Fig. 21 a finish suitable for a so-called "flat" roof. However, the cornice mold herein disclosed is particularly suitable for use with an outer wall face form of the character shown in Figs. 2, 3 and 21, comprising the channel members 131 and wall panels 135 previously described. It comprises a plurality of elongate, horizontally disposed sections 243, each comprising a cornice mold panel 244, shaped to the desired contour of the cornice; a wall forming drop 245 at the lower longitudinal margin of the panel, coextensive therewith; an outstanding horizontal flange 246 at the lower margin of the drop and coextensive therewith, this flange being of a depth substantially equal to the upper flange 138 of the wall panel 135 and to rest thereupon when the cornice mold is in assembled relation on the outer wall face form; at least one bracket 247 detachably secured as by means 248 to the channel members 131 of the wall forms and bearing against the outer face of the panel 244 intermediate its ends; and an outstanding vertical flange 249 at each end of and rigidly secured to the panel 244 for abutting relation with the adjacent flange of the next section 243. Means 250 is provided for detachably securing the outstanding flanges 249 of adjacent mold panels together, and means 251 is provided for detachably securing the outstanding horizontal flanges 246 to the upper outwardly extending flanges 138 of adjacent wall panels 135.

To facilitate manufacture of the mold panel 244, it may comprise a major portion 252 made of sheet metal rolled or otherwise shaped to the desired contour and having an outstanding upper strengthening flange 253 welded thereto. The wall forming drop 245 may be the web of a channel section of which the lower flange is that designated 246 and the upper flange 254 welded to the under side of the mold panel 244, serving to strengthen the latter. The flange 246 is provided with transverse holes 255 for the reception of bolts 256 forming a part of means 250.

The bracket 247 shown in side elevation in Fig. 12, may be a flat piece of material having an inner and upper margin 257 to conform to the outer contour of the mold panel 244, an upright rear margin 258 to abut against the flanges 246 and 254, an inner lower beveled face 259 to conform with the bevel 157 at the upper end of the chanel member 131, as shown in Fig. 11, and the remaining marginal portions 260 and 261 may take any suitable shape, such as at right angle to each other. Suitable transverse holes 262 may be provided near the lower portion of the bracket for the reception of bolts 263 forming a part of means 248. This means 248 may comprise, in addition to bolts 263, a plate 264 provided with upper transverse holes 265 for the bolts, and rear transverse holes 266 for the reception of bolts 267 to secure the plate 264 to the channel member. The bolts 267 may also be received in selected holes 164 of the second series in the flange of the channel section 131 previously described.

The outstanding vertical flanges 246 may each be cut or stamped from sheet metal of the pattern shown in Fig. 13, where the inner margin 268 conforms to the inner contour of the mold panel, the rear lower margin 267 to the web 245 and the lower margin 270 to the flange 246. The front margin 271 may take any suitable shape. Transverse holes 272 are provided for the reception of bolts 273 forming a part of means 250.

The construction and assembly of the cornice mold makes possible the stocking of sufficient quantities of sections 243 of different lengths, and a selection therefrom to meet particular building specifications, and the brackets 247 not being secured to the mold panel may be placed wherever channel members 131 may occur in a particular assembly, to properly support the cornice mold panels.

The apparatus 99 for forming horizontal voids 64 in the wall, in communication with the vertical voids 63, and for reinforcing the wall, is shown more particularly in Figs. 3, 17 and 18. This apparatus may be made, as on a bench, as a unit, and set up on the footing 60 either before or after the side forms are erected, or may be progressively assembled in situ. It comprises mainly, a plurality of vertically spaced inforcing rods 274 arranged in pairs, a plurality of tubes 275 arranged between the rods of each pair, and means 276 engaging the rods and tubes for securing the tubes in the desired position against displacement as cementitious material is poured into the cavity between the wall forms and about the reinforcing rods and tubes. In the example shown in Figure 3, suitable ties 277 are disclosed for securing the lower end portions of the rods to the reinforcement stubs 80, and a suitable steadying bar 278 is also disclosed to temporarily hold the rods at their upper ends against displacement.

The rods 274 may be of any suitable cross section with one rod of each pair adjacent to and spaced from one of the upright wall forms, and the other adjacent to and spaced from the other upright wall form as shown in Figure 3. The tie 277 may be wire wrapped around the lower end of the rod and its adjacent reinforcement stub. The upper ends of the rods may extend thru holes 279 in the bar 278, which is temporarily secured to one of the wall forms as by bolt 280.

The tubes 275 may be of any suitable, inexpensive material capable of withstanding the pressure of the superimposed load of concrete, until it has become set. It is preferred to use tubes which may be cut from tubular stocks, with a saw, or other suitable instrument, to the desired length and to have the open ends of the tubes in planes perpendicular to the axes of the tubes. However, these tubes may be of molded material, such as clay, of the desired length, or of sheet metal formed into tubes. The open ends of the tubes either abut against opening frames 67 forming a permanent part of the building, as shown in Fig. 18, or against core forms 83 of any suitable or well known character, such as the core shown in the aforesaid Patent 814,154, indicated in Fig. 3, which are subsequently removed to provide horizontal and vertical airways in communication with each other.

The means 276, in the example shown, are wires arranged in U-shaped formation embracing the tubes and having their end portions 281 wrapped around the reinforcing rods, but this is merely by way of example since any suitable means may be provided for this purpose.

The assembly described may be made as a unit, on the bench, and subsequently placed between the wall forms, or the reinforcing rods may first be placed and supported between the wall forms, and the tubes secured in place progressively from the bottom to the top as the wall panels are placed. For relatively small buildings, the means 276 may be dispensed with and the tubes placed on partially set concrete previously poured as the wall panels are placed and the reinforcing rods 274 may also be dispensed with under such conditions for some small walls may not require reinforcing or accurate placing of the tubes. Under certain conditions, the tubes may be placed in peripheral contact with one another and not spaced apart, as shown in Fig. 3.

The opening frame 67, of which only those for window openings are disclosed since door openings may well be framed in a like or similar manner, comprise a sill member 282, companion jamb members 283, and a top member 284, suitable plates 285 to 290, inclusive, being provided to hold these members in proper relation to the adjacent wall form members while the concrete is being poured and until it has set. These plates are detachably secured to the flanges of adjacent wall panels by bolts 292.

The sill member 282 is preferably of a length less than the width of the opening 65 or 66, as the case may be, and in the example shown, comprises a major portion 293 having a horizontal upper face 294 and a minor portion 295 having a slanting upper face 296 to drain water therefrom. In width, the sill member may be greater than the width of the hollow between the runs 129 and 130 of wall form units, as shown in Fig. 17, so that a part of the minor portion 295 may rest upon one of the outer panels 135 while the rear face 297 of the sill member may abut against the inner face of one of the inner wall panels 135. It is proposed to provide a wide groove 298 in the under side of the sill member, extending longitudinally thereof, to permit some of the cementitious material 299, shown in Fig. 18, to enter the groove and bond the sill to the wall or to accommodate a portion of one of the tubes 275. As shown in Fig. 15, the minor portion 295 may have end extensions 300 to give good appearance to the frame at the exterior of the building. The plates 285 and 286 may be used to hold the sill member 282 against horizontal and vertical movement, and the sill member may bear upon the upper ends of reinforcing rods 274.

The companion jamb members 283 may be the product of the same mold and are preferably of a width less than the width of the hollow between the runs 129 and 130 of the wall form units, as shown in Figs. 17 and 18. Each comprises a main body portion 301; a longitudinally extending projection 302 at its outer or sash frame receiving side, this projection 302 terminating as at 303 and 304 short of the top end 305 and bottom end 306, respectively, of the main body portion; and a longitudinally extending projection 307 at its inner or wall material facing side, this projection 307 preferably extending the full length of the main body portion 301. The jamb members 283 are held in position by the lower ends of the projections 302 resting on the sill member 282; by plates 287 and 288 which engage the edge faces 308, and by the top member 284, as hereinafter described. It is to be noted that the plates 287 and 288 cooperate with the wall panels 135 to form a reveal 309 of cementitious material inwardly and outwardly of the jamb members 283, which latter are partially embedded in the finished wall.

The top member 284 is somewhat similar in formation to the jamb member in that it embodies a main body portion 310; a longitudinally extending projection 311 at its under or sash frame engaging face, terminating as at 312, short of the ends 313 of the body portion 310; and a longitudinally extending projection 314 at the top or wall material facing side, which projection may extend the full length of the body portion 310 and serve to facilitate placing some of the reinforcing rods 274. The top member bears at its ends upon the upper ends 305 of the jamb members and the ends of the lower projection 311 bear upon the upper ends of the projections 302 of the jamb members, thus keeping the latter from tilting toward each other. The plates 289 and 290 cooperate with the plates 287 and 288 to keep the frame members properly centered in the opening and to form a reveal 315 at each side of the top member 284.

It is to be noted from Figs. 17 and 18 that there are many air spaces or voids 64 about the frame 67 so as to keep the wall dry even adjacent framed openings. This also assists in preventing the fogging of windows and corrosion of metal sash and casement windows, and frames.

From the foregoing it will be apparent that, having provided suitable footing 60 with anchor bolts 78 and reinforcing stubs 80 and 80ᵃ extending upwardly therefrom, the hollow wall portions 62 with framed openings, such as 65 and 66 may be produced. The channel members 131 are first properly spaced, secured to the footing and cross braced at their upper portions. The side panels 135 are then secured between the channel members 131 and the concrete poured in batches, using any suitable core as previously described, to provide the vertical void 63, if such is desired in any portion of the wall. The scaffolding 180 enables workmen to erect the forms, place cores, etc., without setting up ordinary wooden scaffolding. In the example shown in Fig. 3 the forms, etc., are in readiness to pour the concrete up to a level where the cornice 72 is to be formed. When that level is reached, the cornice mold 84 may be placed, the steadying bars 278 are removed and the pouring of concrete is continued to a level above the cornice gutters 73. Before the concrete has set, anchor bolts 316 may be inserted in the wall for ceiling joists 317 and plates 318 for any suitable roof construction, not shown in the drawings. After any cores 83 used to provide the vertical voids 63 have been removed, a cap 319 may be placed over the vertical voids 63 to produce dead air spaces, and the top of the wall is given any desired finish, such as that shown in Figure 11, suitable for a gable roof.

The construction 69 is suitable for, altho not limited to first or main ventilated floor construction, where there is no objection to girders being partially exposed to view, as in the basement. It comprises suitably spaced girders 320, ceiling slabs 321 and sub-floor slabs 322 in spaced relation providing the horizontal air space 74, supported by the girders, and a suitable floor finish 323, applied upon and concealing the sub-floor.

The girder 320 is preferably of inverted T-shape and the mold 85 for forming same is preferably made mainly of separable rolled metal sections, such as channels and angles, altho the juncture between these and the wall forms is made of special units, parts of which shape the girders and parts shape the wall. More specifically, the mold 85 in the example shown, comprises a sectional, transversely divided, bottom channel member 324 disposed with its web 325 horizontal and uppermost, and its flanges 326 depending downwardly therefrom; two sectional, transversely divided angle members 327 for cooperation, one with each flange 326 to form with the web thereof, the bottom enlarged part 328 of the girder, each angle member 327 comprising a vertical flange 329 and an outwardly extending horizontal flange 330; two sectional, transversely divided, upper channel members 331 for cooperation one with each angle member 327, to form a ledge 332 and a narrow part 333 of the girder, the web 334 of each channel member 331 being vertical and the outstanding flanges 335 and 336 being horizontal with the former resting upon the flange 330 of its companion angle member 327 and offset inwardly therefrom to produce the ledge 332; and suitable end coupling, angle members 337 and 338 cooperating with the angle members 327, the upper channel members 331 and panels 135 of the inside run 130 of wall form units to secure the parts together and to provide an opening 339 between the girder form and the hollow between the runs 129 and 130 of the wall form units. If desired, a transversely divided sectional cover plate 340 shown in Figs. 21, 22 and 39 may be provided, to be temporarily secured to the flanges 336 of the upper channel members 331 after the concrete has been poured in the mold, to prevent unset concrete in the mold from being forced therefrom due to pressure of unset concrete being poured into the wall mold apparatus 81 above the opening 339. The cover plate may carry transverse ribs 341 shown in Fig. 37, to produce transverse ventilating ways, not shown in the drawing, crosswise of the girders.

The channel member 324 of mold 85 may be supported by the channel members 131 of the wall mold apparatus 81, and by one or more similar channel members 88 shown in Fig. 21 intermediate the wall mold apparatus, thru the use of channel member extensions 343 and 344, respectively. The channel member 324 is preferably made in major sections 345 and minor sections 346, an example of which is shown in Fig. 21, to facilitate dismembering the form after the concrete on the girder has set. The minor section 346 is preferably of trapezium shape with downwardly and outwardly beveled ends 347 to conform to the upwardly and outwardly beveled adjacent ends 348 of the major sections 345. The sections 345 and 346 are detachably connected together by plates 349 and bolts 350. By removing the minor section, which may be easily dropped down after the bolts 350 and plates 349 have been taken off, the major sections may be readily removed and handled by workmen. The ends of the channel member 324 adjacent the wall forms may have its flanges 326 beveled inwardly and downwardly as at 351 in Figs. 21 and 33, to conform to the bevel of one of the parts of extension 343, as hereinafter described, and it is preferred to form on the channel member a vertical wall surface molding drop 352 between the flanges 326, which may be bent downwardly from material of the web 325 or otherwise formed and secured in place.

The angle members 327 may be in sections 353 of suitable length for easy handling by workmen and in addition to the longitudinally extending flanges 329 and 330 may have outstanding vertical end flanges 354, for securing the sections 353 together and to the special anchor members 337 adjacent the wall forms. Suitable bolts 355 are provided to secure the sections together and to the members 337. Also suitable bolts 356 are provided to secure the flanges 329 to the flanges 326.

The upper channel members 331 may likewise be made in sections 357 with outstanding, vertical end flanges 358 for securing the sections together and to the special anchor members 338 adjacent the wall forms. Suitable bolts 359 are provided to secure the sections together and to the members 337. Also suitable bolts 360 are provided to secure the flanges 330 and 335 together.

The plate 340 may be secured to the flanges 336 as by bolts 361, the length of the ribs 341 being substantially equal to the width of the space between the webs 324 of companion channel members 331.

In Fig. 34 I show, in perspective, one of the special angle members 337. It comprises a vertical wall 362 forming a part of the enlargement 328 of the girder 320, adjacent the building wall; a vertical wall 363 in right angular relation to wall 362, to form a part of the face of the building wall; a top angular, horizontally disposed flange 364 bordering the top marginal portions of the walls 362 and 363 and provided with transverse holes 365 and 366 for the reception of bolts 367 used in detachably connecting it to the spaced angle members 338 shown in Fig. 35; a bottom horizontally disposed flange 368 bordering the bottom of wall 363 and provided with transverse holes 369 for the reception of bolts 370 used to secure it to a wall panel 135 therebelow; a vertical flange 371 bordering the edge of walls 363 opposite its juncture with walls 362 and provided with a transverse hole 372 for the reception of a bolt 373 used in securing it to another of the wall panels 135; and, a second vertical flange 374 bordering the edge of wall 362 opposite its juncture with wall 363, and provided with a transverse hole 375 for the reception of a bolt 355 previously described as connecting one of the flanges 354 of the channel member 327 to this special angle member 337. It is understood that these members 337 are made "right" and "left" and may be so marked to facilitate assembly, it sufficing to describe one of them specifically.

In Figure 35 I show, in perspective, one of the special members 338 which is similar to member 337 in that it comprises right angularly related vertical walls 376 and 377, the former serving to form a part of the narrow portion 333 of the girder 320 and the latter a part of the building wall; top angular horizontal flange 378 provided with transverse holes 379 and 380, the former for bolts 361 used in securing the end of the plate 340 thereto, and the latter to receive a bolt for securing it to the flange of one of the ordinary side wall panels 135; and vertically disposed end flanges 381 and 382, bordering, respectively, the edges of walls 376 and 377 opposite their juncture, the flange 381 having transverse holes 383 for the reception of bolts 359, such as are used to secure the flanges 358 of sections of the angle members 331 together, and the latter for the reception of bolts 384 used to secure the angle member 338 to an adjacent side wall panel 135. However, I provide the angle member 338 with a bottom horizontally disposed angular flange 385 bordering the bottoms of the vertical walls 376 and 377, the portions 386 of this flange serving to form a portion of the ledge 332 of the girder 320 next adjacent the side wall of the building, and the portion 387 provided with transverse holes 389 for the reception of the bolts 367 previously referred to, as securing the angle members 337 and 338 together. In Fig. 35, I also show a segment of the strips 204 held thereto by screws 307.

The extension 343 for supporting the horizontal, girder forming channel member 324 on vertical channel members 131 of the wall form, comprises a channel segment 390 with its web 391 upright, spaced plates 392, angle plates 393, and bolts 394 and 395 for securing the plates 392 to the members 131 and 390, and the angle plates 393 to the members 324 and 390. The channel segment 390 may be of the same horizontal cross section as the channel member 131 and has its upper portion beveled as at 396 to conform with the bevel 351 at the end of the channel member 324 previously described. The channel segment also has its lower portion beveled as at 397 to provide a bottom face paralleling the face of bevel 396 and for surface contact with the bevel 157 on the top of the channel member 131, shown in Figs. 3, 11 and 21. Thus, by removing the bolts 394 and 395, the segment 390 may be eased away from the channel members 131 and 324, and from the side wall surface molded by the web 391 of the segment, after the concrete of the wall and girder has become set, in the dismembering of the girder mold. In effect, the segment 390 acts as a continuation of the channel member 131.

The extension 344 is similar to extension 343 in that it embodies a channel segment 398 shown in Figs. 21 and 32, plates 399 and 400, and bolts 401 and 402. The exception is that the web 403 of the segment does not act as a wall form and only the bottom is beveled as at 404 to conform with a bevel 405 at the top of channel member 88 used as a temporary column. The plates 399 and 401 detachably secure the segment 398 to the channel member 88 and the plate 400 and bolts 402 detachably connect the segment to the channel member 324. The segment 398 can be eased away from the channel members 88 and 324 when the bolts 401 and 402 and plates 399 and 400 are removed, when dismembering the girder form.

The girder 320 may have metal reinforcements therein of any suitable character. As an example, I show horizontally spaced, longitudinally extending rods 406 in the enlargement 328, which extend into the side wall as shown in Fig. 31, and vertically spaced, horizontally extending rods 407, in the narrow portion 333 of the girder, which may likewise extend into the wall. In Fig. 22, the rods 406 are shown secured to a cross bar 408 and the bar and rod suspended in the girder mold by a bridging bar 409 and depending carrier 410. The bridge bar has its ends in openings 411 in the flanges 334 of channel member 331.

After the girder 320 has been formed and set, and the mold 85 is removed, as well as the wall mold apparatus 81, the ceiling slabs 321 may be let down upon the ledges 332 of the girders. Suitable calking 412 may be placed to seal the edges of the slab as shown in Fig. 28.

After the slabs 321 are placed, the sub-floor slabs 322 may each likewise be placed and calking compound 312 may fill any spaces between the slabs 322, as shown in Fig. 28.

Finally, any floor finish 323, such as concrete, may be poured on the slabs 322, to give a neat, smooth floor surface.

The construction 70 is similar to construction 69 in that it includes suitably spaced girders 414, sub-floor slabs 415 and a suitable floor finish 416. However, instead of ceiling slabs, a reinforced, continuous or unbroken ceiling 417 is formed below the girders 414 by mold means 89 shown in Figs. 37 and 38, and secured to the girders by reinforcing strips 418.

The girder 414 comprises an enlarged lower part 419 and a narrow upper part 420 centered thereabove providing ledges 421. Suitable longitudinally extending reinforcing rods 422, as well as the upper portion 423 of the strips 418 are embedded in the girder, the lower exposed portion 424 of the strips functioning to connect the ceiling to the girder.

Inasmuch as the girder molds 86 for providing the girders 414 are similar to the molds 85, it suffices to describe the difference. Aside from the proportions of angle members 425, upper channel members 426 which correspond to angle members 327 and upper channel members 331, respectively, used in forming the sides of the enlarged part 419, and the ledges 421 and sides of the narrow part 420 of the girder 414, a double channel member 427 is provided to take the place of channel member 324. An end portion of double channel member 427 is shown in Fig. 36. It comprises spaced webs 428 providing a slot 429 for the reception of the lower portion 424 of reinforcing strip 418, and each web 424 preferably has a major depending flange 430 and a narrow depending flange 431, the flanges 430 being outermost. A vertical wall molding drop 432 on the end of double channel member 427 corresponds to the vertical wall molding drop 352 of the channel member shown in Fig. 33. The reinforcing strip 418 and reinforcing rods 422 may be suspended in the mold by a bridge bar 433 and depending carrier 434 in a manner similar to the bridge bar 409 and carrier 410. If desired, the strip 418 may be provided in its upper portion 423 with a series of transverse holes 435 to receive cross bars 436 which firmly anchor the strip 418 in the girder.

The ceiling 417, which cooperates with sub-floor slabs 415 to provide the horizontal air space 75 comprises, in addition to the lower portions 424 of strips 418, reinforcing rods 437 extending thru transverse holes 438 in the lower portion of the bar, and a mass of cementitious material 439, such as concrete, molded in place by mold means 89.

In Figs. 37 and 38, the preferred mold means 89 is disclosed. It contemplates using the channel members 88 and 131 to support it. This is accomplished by substituting for the channel member extensions 343 and 344, relatively shorter extensions 440 for the support of horizontal channel members 441 spaced below and paralleling the bottoms of the girders 414, and horizontal ceiling plates 442 detachably secured to the channel members 441 by bolts 443. The extensions 440 each comprises a channel segment 444 with its web 445 vertical, plates 446 and bolts 447 for detachably securing the upright channel member to the segment 444, and plates 448 with bolts 449 for detachably connecting the segments 444 to the channel members 441. As may be noted in Fig. 37, the upper face of web 450 of the channel member 441 serves to shape a part of the ceiling.

After the girders 414 are formed and the concrete is set, the girder molds 86 are removed, the reinforcing rods 437 are placed, and the ceiling mold 89 erected in readiness for pouring of the cementitious material 416. Either before or after this material 416 is set, the sub-floor slabs 415 may be placed, calking if necessary as at 451, and subsequently the floor finish 416 is applied.

The construction 71 is similar to construction 70 in that it includes suitably spaced girders 452 and a ceiling 453, like ceiling 417, but inasmuch as it is desired to provide a horizontal air conducting space 76 above the ceiling and also a dead air space 454 beneath a suitably formed roof 455, the construction 71 also somewhat resembles construction 69 in that there are provided barrier slabs 456 spaced intermediate the ceiling 453 and roof 455.

The girders 452 each resemble the girder 414 in that it comprises an enlarged lower part 457 and a narrow upper part 458 centered thereabove, providing ledges 459. Since the girder molds 87 for producing the girders 414 are each similar to mold 86 and the difference is only in proportion of parts to preferably provide a deeper narrow girder part 458 and a shallower enlarged girder part 457, it suffices to state that the mold 87 comprises a lower double channel member 460, angle members 461 and upper channel members 462, with suitable corner angle members 463 and 464, the members 461 to 464, inclusive, forming the sides of the girder portions 457 and 458, and the ledges 459.

After forming the ceiling 453 as by mold 89, the barrier slabs 456 may be placed in a manner similar to the ceiling slabs 321, using calking 465, and subsequently the roof 455 placed, such comprising in the example shown, sub-roof slabs 466, suitably calked at 467 if necessary, and roof finish 468.

A very important feature of the invention is the wall construction or formation with relatively large vertical air spaces or voids 62 and relatively small horizontal air spaces or voids 63. This not only makes for low cost of construction and efficient insulation against the passage of much heat or cold from one side to the other of the major portions or expanses of walls, and also around glazed openings and doorways, but in addition, enables the walls to be constructed to effectively carry the floor and roof constructions and the live loads coming upon same. The vertical zones 493 where the tubes 275 are located, may be likened to the studding or posts in small buildings, and to columns and pilasters in larger buildings, and may be located mainly where the wall supports the greatest loads or requires greater strength due to openings. The zones 494 between zones 493 may contain one or more vertical airways or voids 63. These zones 494 may be likened to the sheathing, siding, plaster ground and plaster of small buildings, where the tile, brick, or other wall panels between girders and columns of larger buildings. There are these important exceptions, however, as the walls of the present invention are of inexpensive, monolith or integral construction, requiring no special exterior or interior finish, such as painting, coating and plastering, altho such may readily be resorted to if desired, and the wall construction effectively prevents, to a great extent, the passage of heat or cold from one face of the wall to the other, without resorting to insulating materials, such as wool, etc.

It is to be understood that the foregoing illustrations and detailed description of buildings, and apparatus used in forming the same are merely by way of example; that changes in details, proportions and arrangement of parts of the apparatus may be resorted to without departing from the spirit of the invention; that the apparatus may be used to produce many sizes and types of buildings, requiring mainly the sevices of competent architects, builders or engineers to determine, without an exercise of inventive faculty, how to use the apparatus to produce sturdy and inexpensive buildings.

I claim:

1. In mold apparatus for monolithic wall construction, the combination of a plurality of spaced upright channel members each having relatively deep flanges and a web, the outer face of which forms a part of the wall material engaging surface, said flanges of each channel member provided with a first series of vertically spaced transverse holes adjacent the web and a second series of vertically spaced transverse holes adjacent the free margins of the flanges, a plurality of mold panels fitting between said channel members with one face of each panel flush with said outer face of the channel member webs to also form a part of the wall material engaging surface, each panel provided with relatively shallow lateral flanges normal to the plane of its said face, said lateral flanges having holes aligning with holes of the first series of holes in the channel member flanges, means passing thru said aligned holes for detachably connecting said panels to the channel members, scaffolding including deck brackets disposed at said channel members, each bracket including a vertical leg engaging the outer face of a flange of its respective channel member and engaging the lateral flange of the next adjacent panel, said bracket leg provided with transverse holes aligned with holes of said second series of holes in the channel member flange, and means extending thru said last mentioned aligned holes for detachably connecting the brackets to the channel member.

2. A form for molding a girder of substantially inverted T-shape cross section between wall section forms, comprising a bottom longitudinally extending channel member disposed with its web horizontal and uppermost, a longitudinally extending angle member for each flange of said channel member, said angle members disposed with their horizontal flanges uppermost and extending in opposite directions and each disposed with the lower portion of its vertical flange abutting the outer face of its respective channel member flange, means for detachably securing the vertical flanges of the angle members to the flanges of said channel member, an upper channel member for each of said angle members, said upper channel members disposed with their webs vertical and their flanges extending outwardly, said upper channel members disposed with their webs spaced apart a distance less than the distance between the webs of said angle members and each disposed with its lower flange bearing upon the top face of its respective angle member flange, means for detachably securing the lower flange of each of said upper channel members to the horizontal flange of its respective angle member, and means detachably engaging the upper flanges of said upper channel members for holding them in spaced relation.

3. A form for molding a girder of substantially inverted T-shape cross section integral with a wall, comprising a vertical wall form including an upright channel member, the outer face of the web of which forms a part of the wall material engaging surface, and a plurality of wall panels flush with said face of the channel member web, said panels having vertical flanges detachably connected to the flanges of said channel member, and horizontal flanges; and a girder mold including a bottom longitudinally extending channel member disposed with its web horizontal and uppermost, and detachably connected to said upright channel member of the vertical wall form with its web in right angular relation to the web of the latter and its flanges in the same planes as the flanges of said upright channel member, a longitudinally extending angle member for each flange of said bottom channel member, said angle members disposed with their horizontal flanges uppermost and extending in opposite directions, and each disposed with the lower portion of its vertical flange abutting the outer face of its respective bottom channel member flange, said longitudinally extending angle members each having a right angularly disposed panel portion to fit in and form a part of the vertical wall forms, means for detachably securing the vertical flanges of the angle members to the flanges of said bottom channel member, and said panel portions of the angle members to the adjacent panels of the wall form, an upper channel member for each of said angle members, said upper channel members disposed with their webs vertical and their flanges extending outwardly, said upper channel members disposed with their webs spaced apart a distance less than the distance between the vertical flanges of said angle members and each disposed with its lower flange bearing upon the top face of its respective angle member flange, said upper channel members each having a right angularly disposed panel portion to fit in and form a part of the vertical wall forms, and means for detachably securing the lower flange of each of said upper channel members to the horizontal flange of its respective angle member, and said panel portions of the upper channel members to adjacent panels of the wall form.

4. In apparatus for forming girders of buildings, the combination of an upright supporting channel member including a lower section and an upper section in alignment therewith, the line of division between the sections extending diagonally downwardly from the web of the lower section toward the free ends of the flanges thereof, and means for detachably connecting said lower and upper sections together; a form located above said channel member for shaping the lower surface of a horizontally disposed molded structural member of the building; and means detachably connecting the upper section of said channel member to said form, whereby the form may be removed by detaching the upper section of the supporting channel member from the lower portion thereof and easing the form away from the molded structural member by sliding the upper section of the supporting channel member along the diagonal upper surface of the lower section thereof.

5. In a mold for monolithic wall construction, the combination of an upright channel member having a web and relatively deep vertical flanges normal to the plane of its web, the outer face of said web to form a part of the wall material engaging surface, and each of the flanges of the channel member provided with a first series of vertically spaced transverse holes adjacent the web, and a second series of vertically spaced transverse holes adjacent the free margin of the flange; mold panels fitting edgewise against the outer faces of said channel member flanges with one face of each panel flush with the outer face of the channel member web to also form a part of the wall material engaging surface, each of said panels provided with a relatively narrow lateral flange normal to its said face, abutting against the adjacent relatively deep flange of the channel member, said lateral flange of each panel having holes aligned with holes of the first series of holes in the adjacent channel member flange, and its free margin spaced from and paralleling said second series of holes of the adjacent channel member flange; means passing thru said aligned holes of the panel flanges and channel member flanges, detachably securing the mold panels to the channel member; a bracket provided with transverse holes aligning with holes of said second series of holes of one of the channel member flanges; and means passing thru said last mentioned aligning holes, detachably securing said bracket to the channel member.

WILLIAM R. MATHIS.

REFERENCES CITED

The following references are of record in the file of this patent:

UNITED STATES PATENTS

| Number | Name | Date |
|---|---|---|
| 1,530,283 | Nelson | Mar. 17, 1925 |
| 1,022,841 | Giletti | Apr. 9, 1912 |
| 1,101,020 | Fleck | June 23, 1914 |
| 1,965,319 | Romero | July 3, 1934 |
| 954,814 | Lawrence | Apr. 12, 1910 |
| 2,107,523 | Coe | Feb. 8, 1938 |
| 773,303 | Townsend | Oct. 25, 1904 |
| 987,303 | Keller | Mar. 21, 1911 |
| 1,520,840 | Murray | Dec. 30, 1924 |
| 1,597,163 | Krump | Aug. 24, 1926 |
| 1,584,019 | Doving | May 11, 1926 |
| 1,856,589 | Peterson et al. | May 3, 1932 |
| 2,046,123 | Jennings | June 30, 1936 |
| 1,202,038 | Eastman | Oct. 24, 1916 |

FOREIGN PATENTS

| Number | Country | Date |
|---|---|---|
| 586,242 | France | Mar. 20, 1925 |